(12) United States Patent
Fu et al.

(10) Patent No.: US 10,788,432 B2
(45) Date of Patent: Sep. 29, 2020

(54) WELD SCANNER FOR REAL-LIFE BRIDGE AND SCANNING METHOD THEREOF

(71) Applicant: Hohai University, Nanjing, Jiangsu (CN)

(72) Inventors: Zhongqiu Fu, Jiangsu (CN); Bohai Ji, Jiangsu (CN); Qiudong Wang, Jiangsu (CN); Zhouzhiyuan Yuan, Jiangsu (CN)

(73) Assignee: Hohai University, Nanjing, Jiangsu (CN)

( * ) Notice: Subject to any disclaimer, the term of this patent is extended or adjusted under 35 U.S.C. 154(b) by 78 days.

(21) Appl. No.: 16/309,174

(22) PCT Filed: Apr. 28, 2017

(86) PCT No.: PCT/CN2017/082558
§ 371 (c)(1),
(2) Date: Dec. 12, 2018

(87) PCT Pub. No.: WO2017/215359
PCT Pub. Date: Dec. 21, 2017

(65) Prior Publication Data
US 2019/0331610 A1    Oct. 31, 2019

(30) Foreign Application Priority Data
Jun. 13, 2016 (CN) .......................... 2016 1 0412408

(51) Int. Cl.
*G01N 21/95* (2006.01)
*G01N 27/83* (2006.01)

(52) U.S. Cl.
CPC ............. *G01N 21/95* (2013.01); *G01N 27/83* (2013.01); *G01N 2201/103* (2013.01)

(58) Field of Classification Search
CPC .......................... G01N 21/95; G01N 2201/103
See application file for complete search history.

(56) References Cited

U.S. PATENT DOCUMENTS

| 2009/0161212 A1* | 6/2009 | Gough | ..................... B23K 9/32 |
| | | | 359/462 |
| 2015/0165540 A1* | 6/2015 | Cole | .................... B23K 9/0213 |
| | | | 219/76.14 |

FOREIGN PATENT DOCUMENTS

| CN | 102139398 | 8/2011 |
| CN | 104391033 | 3/2015 |

(Continued)

OTHER PUBLICATIONS

International Search Report filed in PCT/CN2017/082558 dated Jun. 28, 2017.

*Primary Examiner* — Jamil Ahmed
(74) *Attorney, Agent, or Firm* — Rankin Hill & Clark LLP

(57) ABSTRACT

A weld scanner for a real-life bridge and scanning method thereof is disclosed. The weld scanner includes a running portion and a scanning portion mounted on a scanner chassis. A front end and a tail end of the scanner chassis are both provided with a laser range finder. A magnet is arranged at a bottom portion of the scanner chassis. The scanning portion includes a probe slider, a bendable metal pipe and a probe connected in sequence. A gear is arranged on the probe slider, and the gear is meshed with a rack inside a scanner chassis chute. The weld scanner scans while the running portion moves forward along a weld, and scans a suspected defect position more carefully when a magnetic field change is detected.

6 Claims, 6 Drawing Sheets

(56) References Cited

FOREIGN PATENT DOCUMENTS

| | | | |
|---|---|---|---|
| CN | 204228622 | 3/2015 | |
| CN | 104977351 | 10/2015 | |
| CN | 104977351 A * | 10/2015 | ............. G01N 27/84 |
| CN | 106053592 | 10/2016 | |
| JP | H03128189 | 5/1991 | |

* cited by examiner

WELD SCANNER FOR REAL-LIFE BRIDGE AND SCANNING METHOD THEREOF

TECHNICAL FIELD

The present invention relates to nondestructive detection equipment, and more particularly, to a weld scanner for real-life bridge and scanning method thereof.

BACKGROUND

An orthotropic steel bridge deck plate has the advantages of light weight, high torsional rigidity, high bearing capacity and short construction period, and has been widely used in a long-span cable system bridge. However, a steel box girder is complicated in structure, and it is easy to generate large welding residual stress in a welding process. In addition, due to a possible defect of the structure itself and the influence of construction quality, a damage will inevitably occur in a service process. With the increase of bridge service life and traffic flow, the steel box girder gradually produces various defects, of which fatigue is one of the representative defects. The generation of a fatigue crack can not only adversely affect the stress of the structure, but also cause damage to the deck pavement when the crack is penetrated through, and rain water entering the steel box girder along the crack can further cause corrosion of the box girder, and other problems. Therefore, the fatigue crack of the steel box girder shall be found and repaired as soon as possible.

Due to the complicated structure of the steel box girder and the large number of welds, the inspection work of the weld at the key portions of the steel box girder is very heavy. At present, the inspection of the weld of the steel box girder in China is mostly conducted in stages, an appearance of the weld is mainly inspected by an inspector through visual method, with low efficiency and low inspection quality. Although the accuracy has been improved to a certain extent when ultrasonic detection is applied to the actual bridge weld detection, the cost is high and the ultrasonic actual bridge detection technology is not yet mature, which is mostly used in factory and laboratory.

It can be seen that the design of a weld scanner for real-life bridge with low cost, high efficiency and good accuracy has become a technical problem to be solved urgently.

SUMMARY

Object of the present invention: in order to overcome the defects in the prior art, the present invention provides a weld scanner for real-life bridge and a scanning method thereof.

Technical solutions: in order to solve the technical problems above, the weld scanner for real-life bridge provided by the present invention comprises a running portion and a scanning portion mounted on a scanner chassis, wherein a front end and a tail end of the scanner chassis are both provided with a laser range finder, a magnet is arranged at a bottom portion of the scanner chassis, the scanning portion and the running portion are connected by a chute, and the chute is parallel to a running direction of a running device. In the case of a long weld (such as a weld between a top plate of the steel box girder and a U-rib, with a length of one bin, which is 3 to 4 m), an advancing direction of the weld scanner may be adjusted to be parallel to the weld by the laser range finder; at the moment, the weld scanner may not deviate from an originally set route in the working process, so that an advancing position of the weld scanner may be accurately controlled.

Preferably, the magnet is an artificial permanent magnet, and an attraction between a magnet and an inner wall of the steel box girder enables the weld scanner to scan the weld on the top portion of the box girder without falling off.

Preferably, the scanner chassis is internally provided with a power supply and a control device. The power supply may reasonably distribute the voltage required by each part of the weld scanner in a normal working room, and the control device may accurately control the rotation speed of the probe motor and the scanner drive motor by using an element such as a frequency converter, thereby accurately controlling a movement speed of the probe and an advancing speed of the scanner.

Preferably, the control device is connected to a wireless transceiver, such as a Bluetooth signal transceiver, wherein signals collected on an integrated circuit board are wirelessly transmitted to the client through a Bluetooth transmitter, so as to control the scanning process in real time.

Preferably, the scanning portion comprises a probe slider, a bendable metal pipe and a probe connected in sequence, a gear is arranged on the probe slider, and the gear is meshed with a rack in the chute. When the scanner moves forward to an end portion of the weld and cannot run, the probe slider may be driven to slide in the chute by the rotation of the probe motor, thereby scanning the remaining weld. A position of the probe may be adjusted before scanning through bending the bendable metal pipe to improve the accuracy of scanning detection.

Preferably, the probe comprises a fixed sleeve, a magnet, a magnetic resistance sensor and a camera, the magnet is mounted in the fixed sleeve, the magnetic resistance sensor is mounted at an end of the magnet, and the camera is fixedly mounted on an outer wall of the sleeve. When a weld defect is scanned, a magnetic field formed by the magnet may change, and the magnetic resistance sensor may sense the change and transmit a change signal to the circuit board, and finally transmit the change signal to the client. When the magnetic resistance sensor detects the magnetic field change, the camera may photograph the corresponding position immediately, thereby obtaining a macroscopic image of the suspected defect part.

Preferably, a wheel of the running portion is wrapped with a rubber pad, thereby realizing the stability of the weld scanner in an advancing process and avoiding an adverse impact of bump on the scanning accuracy. A wall of the scanner chassis is provided with a wire through hole, the scanner chassis and the probe slider are provided with a USB interface, and the scanner chassis may be smoothly connected to the probe slider through a USB cable connecting the scanner chassis and the probe slider. An end portion of the scanner chassis chute is provided with a detachable fixing baffle, which is connected to the scanner chassis through a rotational rod and a fixing bolt, so that the baffle may be removed firstly when the baffle is not in use, and then the scanning portion is taken out.

The present invention provides a scanning method of the weld scanner for real-life bridge above at the same time, which comprises the following steps:

the weld scanner scans along a weld direction and gathers signals of all members to a control device;

the control device controls the running portion and the scanning portion, and sends the signals to a client; and the client analyzes the signals, further obtain a coordinate and a macroscopic image of a suspected defect position according to initially set coordinate positions, and control an advancing speed of the weld scanner by controlling a frequency converter of the weld scanner, can slow down a running speed at the defect position, or make the scanning portion reciprocate using the chute, so that the weld scanner can scan the suspected defect position more carefully when a magnetic field change is detected.

When in use, the probe slider, the motor, the bendable metal pipe, the magnet fixing sleeve and the camera fixing sleeve of the actual bridge weld scanner of the present invention are fixedly connected together, and the probe slider may slide in the chute through the interaction between the transmission gear and the rack. The artificial magnet is embedded in an artificial magnet embedding hole of the scanner chassis, and the influence of a gravity balanced by the attraction between the artificial magnet and the top plate or the inner wall member of the steel box girder on the scanner is used, so that the weld scanner may run on the top plate or the inner wall member of the steel box girder. The USB interface may further transmit the information such as the image, the magnetic resistance sensor signal and the rotation rate of the motor to the scanner chassis while providing working power required by the camera, the magnetic resistance sensor and the probe motor to realize real-time control over the work of the probe. The laser range finder may emit a beam of laser light through a laser emitting hole, and if a laser receiving hole can receive the emitted laser light, the scanner chassis is parallel to a direction of the weld, thereby accurately controlling a running direction of the scanner. The circuit board in the scanner chassis may collect the signal transmitted from the USB interface, a rotational speed signal of the scanner drive motor is uniformly transmitted to external Bluetooth signal receiving device connected to a computer through the Bluetooth signal transceiver on the circuit board, and a computer terminal processes the received signal through a matching program, so as to obtain information such as the magnetic field change, the image, the real-time coordinate of the weld scanner, thereby efficiently scanning the actual bridge weld.

The artificial magnet is arranged at a bottom portion of the scanner chassis, and the attraction between the magnet and the inner wall of the steel box girder may enable the weld scanner to scan the weld in a top portion of the box girder without falling off, which is as shown in the following formula:

$$F_{Magnet} = G_{Scanner} + C$$

where $F_{Magnet}$ is the attraction between the artificial magnet and the steel box girder member, $G_{Scanner}$ is a gravity of the scanner itself; and C is a positive number.

Beneficial effects: the present invention scans while the running portion moves forward along a weld, and scans a suspected defect position more carefully when a magnetic field change is detected. The present invention implements the functions such as accurately detecting and positioning weld defects of a steel box girder, photographing a macroscopic defect phenomenon in real time, and determining a coordinate position of the scanner, solves the problems of long time consumption, low efficiency, high cost of manually detecting the welds of the steel box girder at the present stage, improves the detection efficiency and quality of the actual bridge weld, and effectively reduces the detection cost.

In addition to the technical problems solved by the present invention above, the technical features constituting the technical solutions and the advantages brought about by the technical features of these technical solutions, other techni-cal problems solved by the weld scanner for real-life bridge and the scanning method thereof according to the present invention, other technical features contained in the technical solutions, and the advantages brought about by these technical features will be further described in detail with reference to the accompanying drawings.

Figure 1:
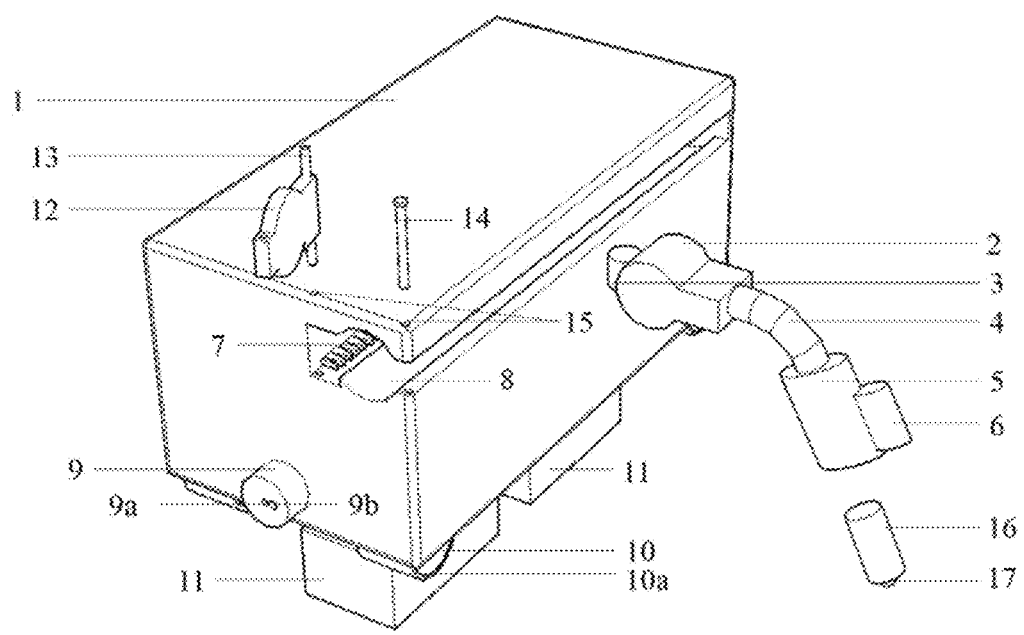
FIG. 1 is a front external diagram of a scanner.
Figure 2:
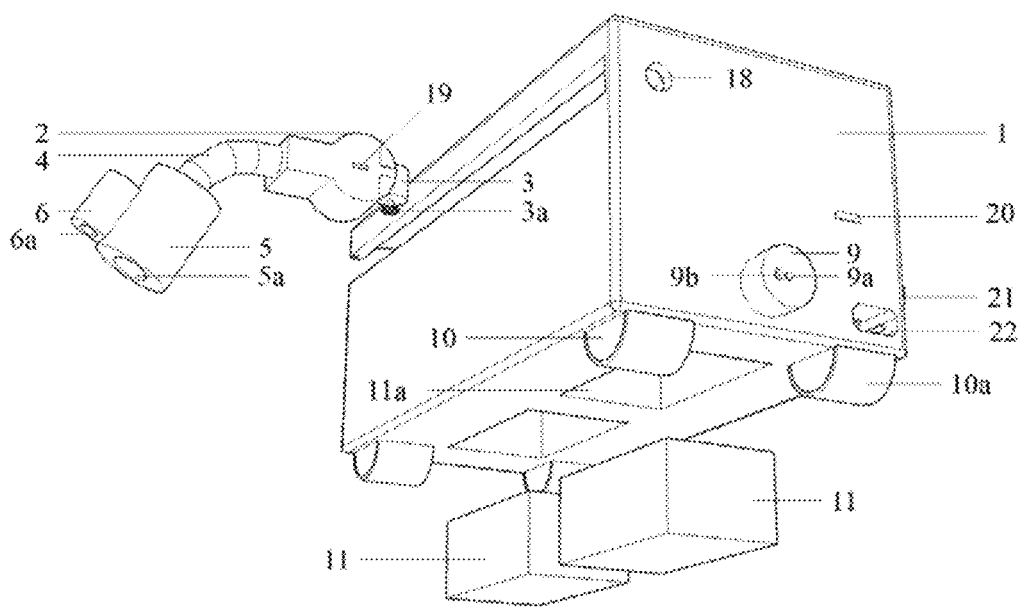
FIG. 2 is a rear external diagram of the scanner.

In the drawings: 1 refers to scanner chassis, 2 refers to probe slider, 2a refers to placement hole of probe slider circuit board, 2b and 2c refer to probe slider circuit holes, 3 refers to probe motor, 3a refers to transmission gear, 4 refers to bendable metal pipe, 5 refers to magnet fixing sleeve, 5a refers to magnet mounting hole, 6 refers to camera fixing sleeve, 6a refers to camera mounting hole, 7 refers to rack, 8 refers to chute, 9 refers to laser range finder, 9a refers to laser transmitting hole, 9b refers to laser receiving hole, 10 refers to scanner wheel, 10a refers to rubber coat, 11 refers to first artificial magnet, 16 refers to second artificial magnet, 11a refers to artificial magnet embedding hole, 12 refers to fixing baffle, 13 refers to rotational rod, 14 refers to fixing bolt, 15 refers to round hole, 17 refers to magnetic resistance sensor, 18 refers to wire through hole, 19 refers to first USB interface, 20 refers to second USB interface, 21 refers to power switch, 22 refers to power interface, 23 refers to circuit board, 24 refers to Bluetooth signal transceiver, and 25 refers to probe circuit hole.

DETAILED DESCRIPTION

First Embodiment

Taking the scanning to a weld between a top plate of a bin of a steel box girder and a U-rib as an example, as shown in FIG. 1, FIG. 2, FIG. 5, FIG. 6 and FIG. 7, a weld scanner for real-life bridge comprises a scanner chassis 1, a probe slider 2, a placement hole of probe slider circuit board 2a, probe slider circuit holes 2b and 2c, a probe motor 3, a transmission gear 3a, a bendable metal pipe 4, a magnet fixing sleeve 5, a magnet mounting hole 5a, a camera fixing sleeve 6, a camera mounting hole 6a, a rack 7, a chute 8, a laser range finder 9, a laser transmitting hole 9a, a laser receiving hole 9b, a scanner wheel 10, a rubber coat 10a, a first artificial magnet 11, a second artificial magnet 16, an artificial magnet embedding hole 11a, a fixing baffle 12, a rotational rod 13, a fixing bolt 14, a round hole 15, a magnetic resistance sensor 17, a wire through hole 18, a first USB interface 19, a second USB interface 20, a power switch 21, a power interface 22, a circuit board 23, a Bluetooth signal transceiver 24, and a probe circuit hole 25. The artificial magnet 11 may be embedded into a bottom portion of the scanner chassis 1, and the scanner smoothly runs on a top portion and an inner wall of the steel box girder through an attraction between the artificial magnet and the inner wall of the steel box girder. The probe slider 2 may slide in the chute 8 through the interaction between the probe motor 3 and the rack 7. The fixing baffle 12 may fix the probe slider 2 through the rotational rod 13 and the fixing bolt 14 to prevent the probe slider 2 from falling out of the chute 8. The laser range finder 9 may check a position of the scanner chassis 1 to ensure that an advancing direction thereof is parallel to the weld.

As shown in FIG. 1, FIG. 2, FIG. 8, FIG. 9 and FIG. 10, all members of the weld scanner are mounted, the laser range finder 9 close to the magnetic resistance sensor is pushed to the inner wall of the steel box girder, the corresponding position thereof is used as a starting position for the scanner to move forward, and a coordinate in a temporary coordinate system is set as A (0, 0). Since the bendable metal pipe 4 of the scanning portion may be bent, a position of the magnetic resistance sensor 17 may be adjusted according to actual needs. After adjustment, a distance between a probe of the magnetic resistance sensor and an origin of coordinates (i.e. the laser range finder) is measured to be $d_1$, and a coordinate $(d_1, 0)$ of a scanning start may be obtained by inputting $d_1$ into a client program. An external power supply is connected to the scanner through the power interface 22. The power switch 21 of the weld scanner is turned on, and if the power supply is normal, the weld scanner may send a signal $s_g$ of normal power supply to a client through the Bluetooth signal transceiver 24. The client judges a received Bluetooth signal and displays a result:

---
If $s_g$=1, then
 Text1= "normal power supply"
Else
 Text1= "normal power supply"
End

---

Figure 3:
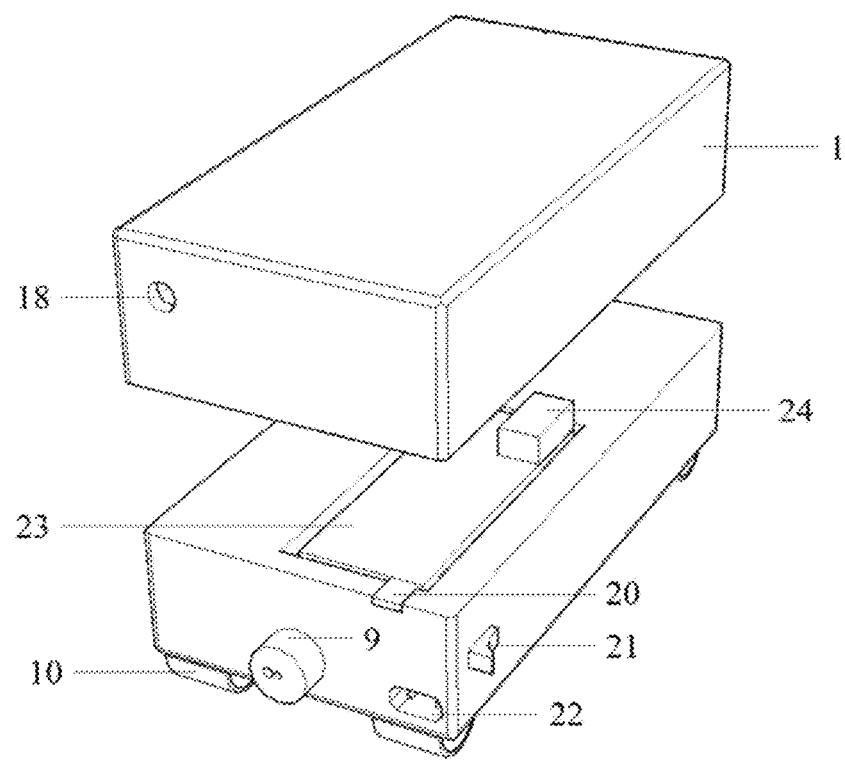
FIG. 3 is a sectional view of a circuit board position of the scanner.
Figure 8:
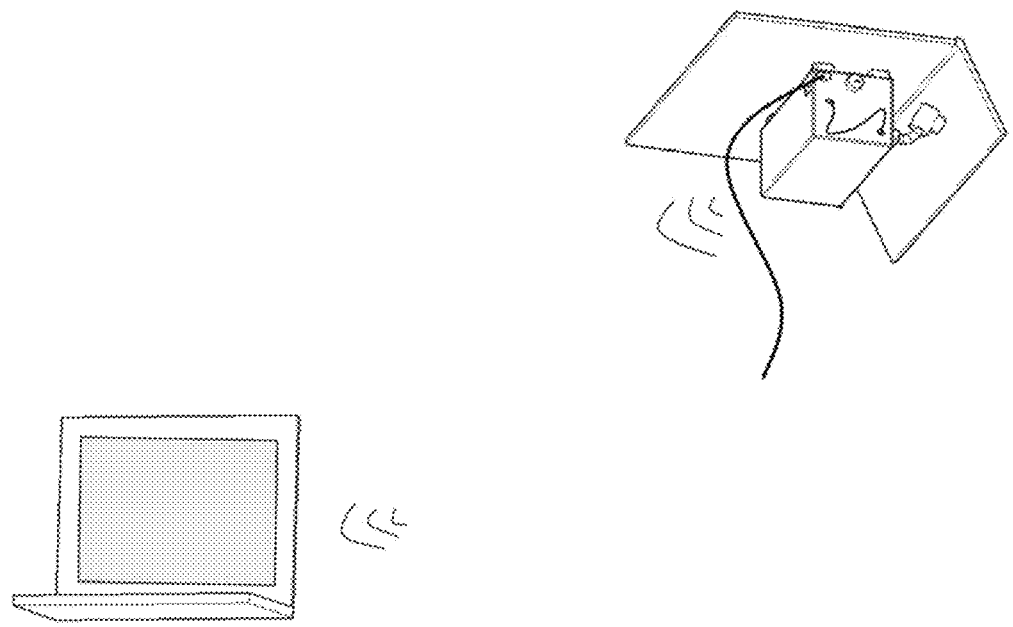
FIG. 8 is an implementation diagram of the scanner.
Figure 11:
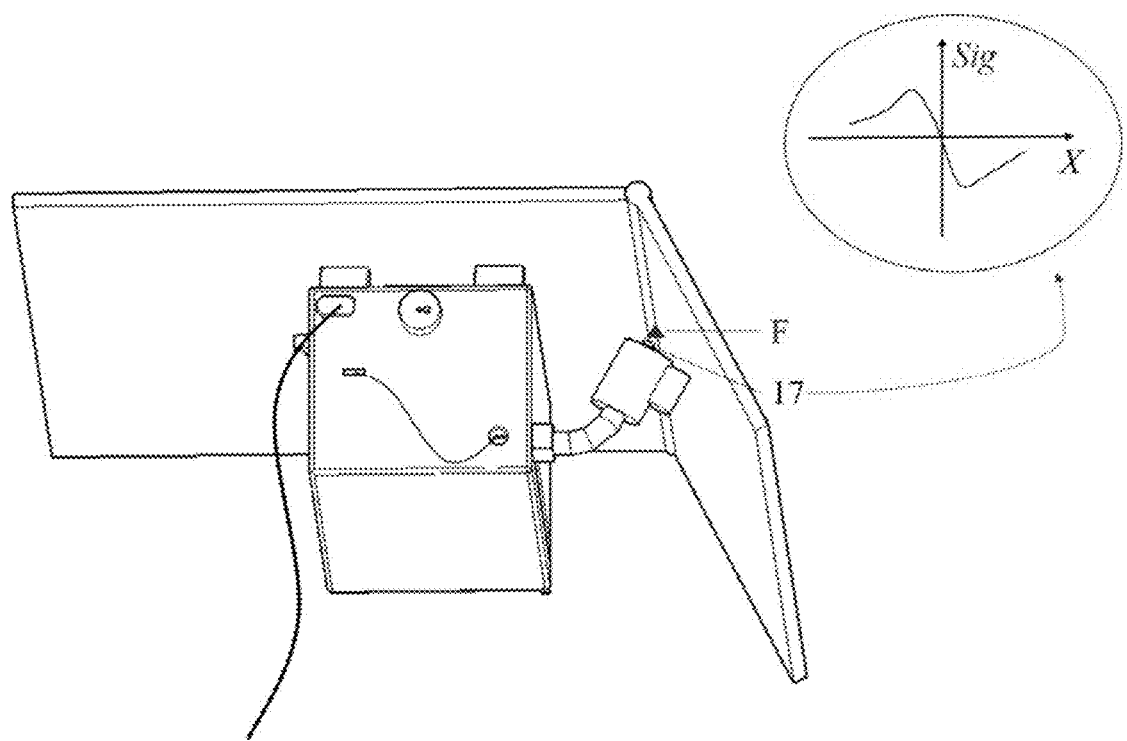
FIG. 11 is a diagram illustrating a signal change principle of a magnetic resistance sensor of the scanner.

As shown in FIG. 3, FIG. 8 and FIG. 11, the weld scanner scans along a weld direction, i.e., a direction of a vector i, collects signals of all members on the circuit board 23, and sends the signals to the client through the Bluetooth signal transceiver 24. The signals collected by the circuit board comprise: a power supply signal $s_g$, a magnetic resistance sensor signal $s_c$, a rotation speed $s_{x1}$ of a scanner drive motor, a rotation speed $s_{x2}$ of the probe motor, and a photographic picture signal $s_t$ of a camera, wherein the power supply signal $s_g$, the magnetic resistance sensor signal $s_c$, the rotation speed $s_{x1}$ of the scanner drive motor and the rotation speed $s_{x2}$ of the probe motor constitute a signal matrix A={$s_g, s_C, s_{x1}, s_{x2}$}, and the client multiplies A with a unit matrix $$B = \begin{bmatrix} 1,0,0,0 \\ 0,1,0,0 \\ 0,0,1,0 \\ 0,0,0,1 \end{bmatrix},$$

i.e., A·B, to obtain a received signal digital matrix C={a, b, c, d}, so that the client may process information in the C matrix. For example:

(1) Obtaining a Coordinate of a Suspected Defect Position F

The client program processes the received magnetic resistance sensor signal $s_c$, if the signal $s_c$ is changed, b=1, and a running distance of the scanner may be calculated from the formula x=$d_1$+c·t·α to obtain a coordinate ($d_1$+c·t·α,0) of the defect position, wherein c is the rotation speed of the scanner drive motor, which may be controlled by a frequency converter on the circuit board 23; t is advancing time of the weld scanner; and α is a conversion coefficient, and represents an advancing distance of the scanner when the transmission gear of the scanner drive motor rotates by one circle, which depends on specific parameters of the transmission gear of the scanner drive motor.

(2) Obtaining a Macroscopic Photo of the Suspected Defect Position

The client program processes the received signal, if the magnetic resistance sensor detects a magnetic field change at the moment, the client program sends an instruction, the circuit board in the scanner chassis recognizes the instruction at the moment and executes the instruction, and the camera conducts a photographing operation after executing the instruction, and sends obtained picture signal $s_t$ to the client. The client program processes the received signal $s_t$ to obtain a macroscopic image of a suspected defect area.

Figure 4:
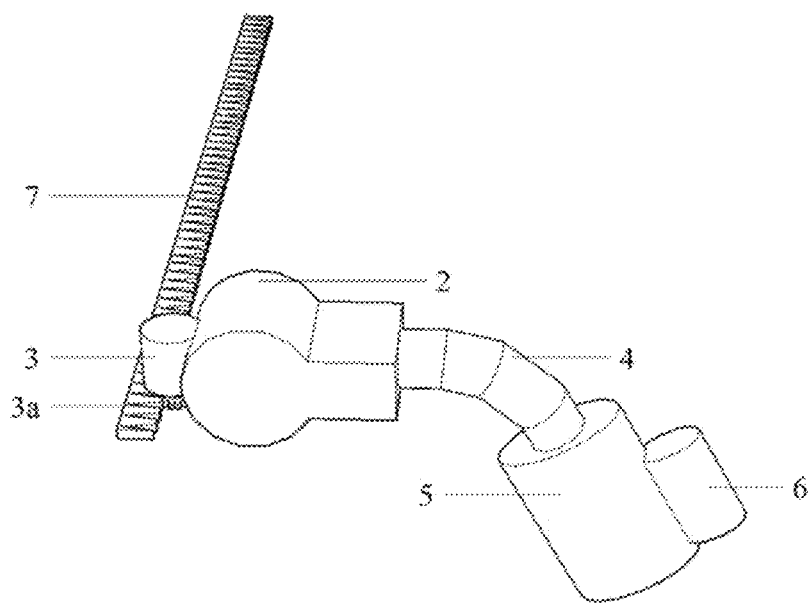
FIG. 4 is a diagram illustrating cooperation between a probe motor and a rack of the scanner.
Figure 5:
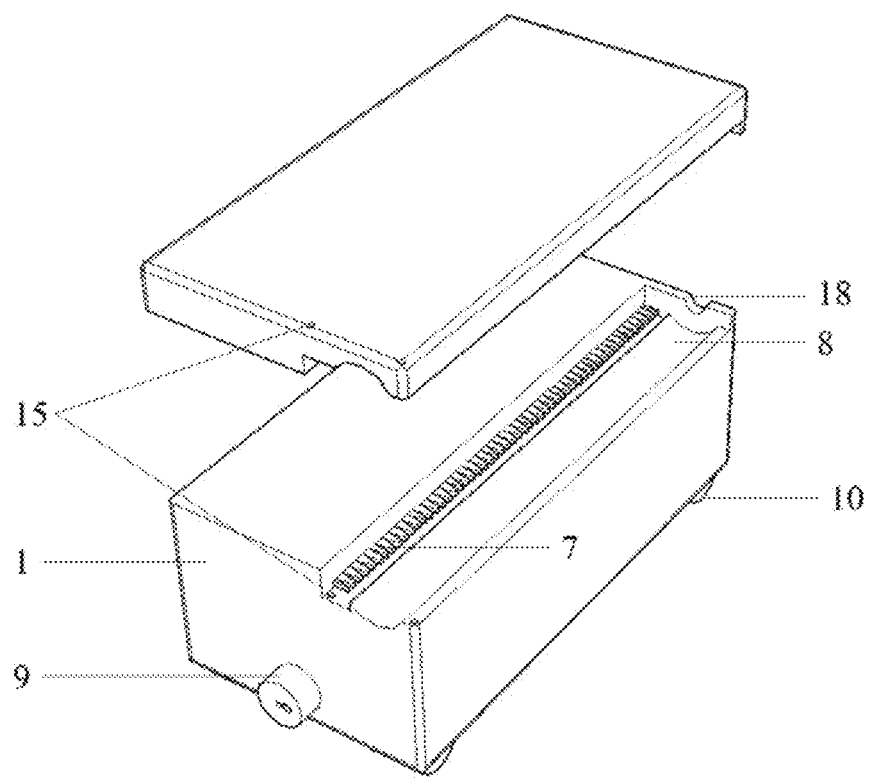
FIG. 5 is a sectional view of the rack in a chute of the scanner.
Figure 6:
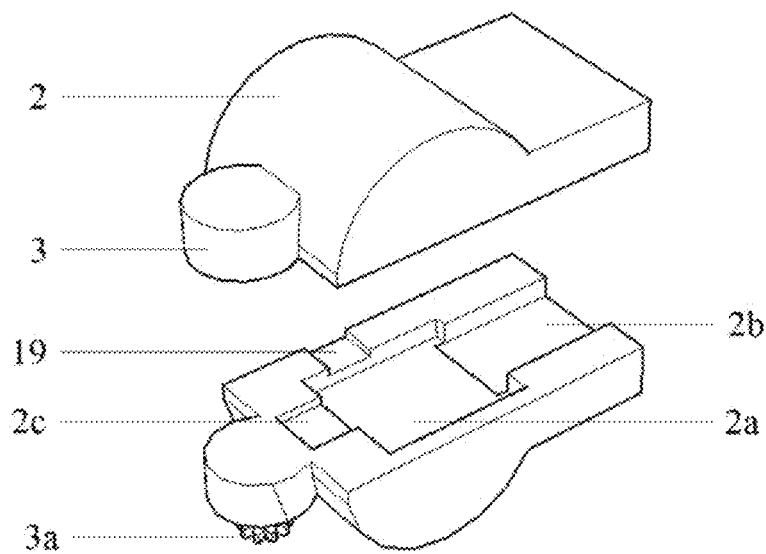
FIG. 6 is a sectional view of an internal structure of a probe slider of the scanner.
Figure 7:
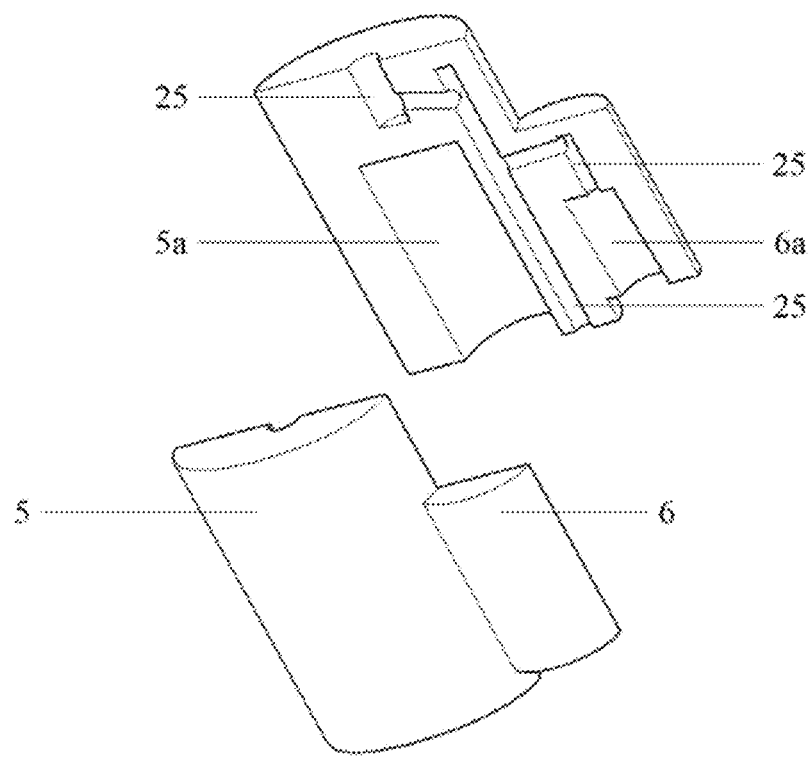
FIG. 7 is a sectional view of internal structures of a magnet fixing sleeve and a camera fixing sleeve of the scanner.
Figure 9:
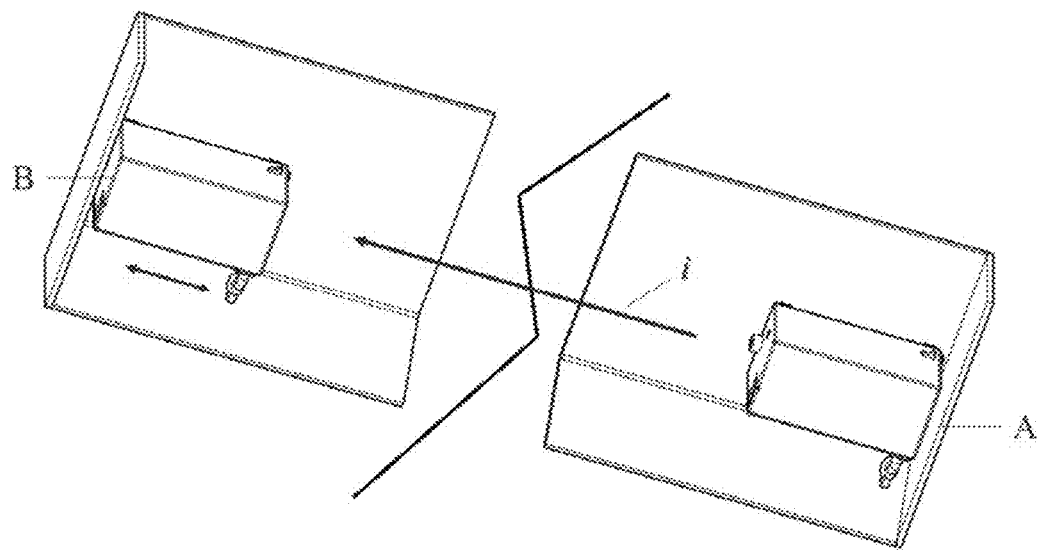
FIG. 9 is a diagram illustrating movement of a probe portion of the scanner.
Figure 10:
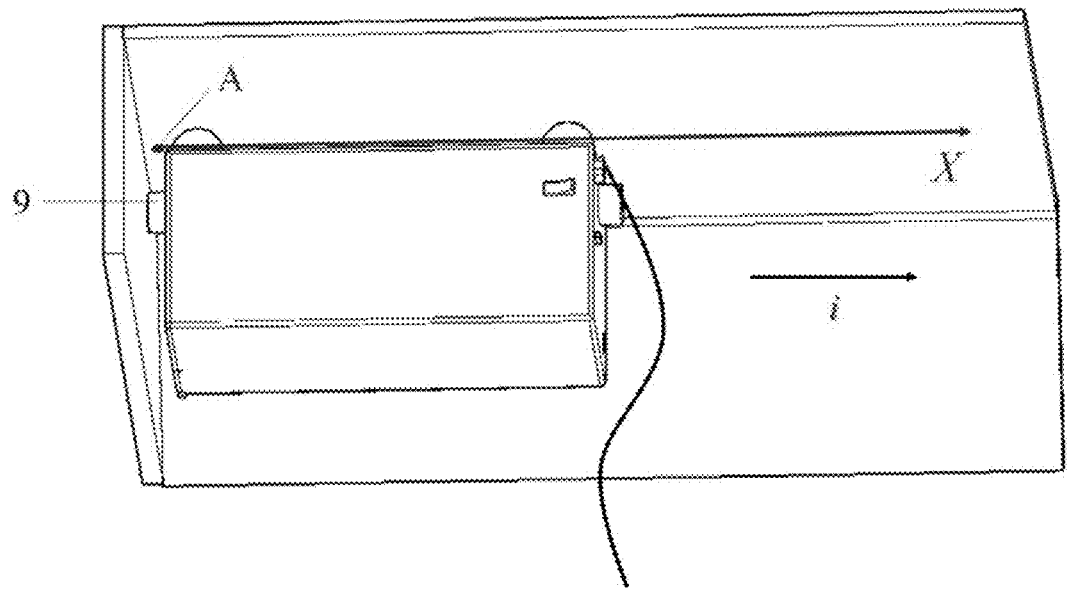
FIG. 10 is a diagram illustrating coordinate setting of the scanner.

As shown in FIG. 4, FIG. 8 and FIG. 9, when the weld scanner reaches an end of the weld, since the scanner chassis itself has a certain size, a scanning probe may complete the scanning to the remaining weld through moving left and right at the moment. The client program may automatically determine whether the scanner reaches the end of the weld:

---
If $d_1 + c \cdot t \cdot α = L - D$, then
 $s_{stop} = 1$
 $s_{x2} = 1$
Else
 $s_{stop} = 0$
End

--- where L is a length of the chamber of the steel box girder (i.e., a full length of the weld); and D is a length of the weld scanner. The client sends a judgment result to the scanner chassis, the scanner chassis controls a movement state of the weld scanner according to the received signal $s_{stop}$, wherein $s_{stop}$=1 indicates stop, and $s_{stop}$=0 indicates advancing. $s_{x2}$=1 indicates that the probe motor starts to work at the moment and feeds back rotation speed information to the client program. A length of the rack 8 is set as $l_c$, and the client program may automatically control a distance that the probe slider 2 moves left and right, i.e.:

---
If $d \cdot t_1 \cdot β = λl_c$, then
 $s_{stop} = 0$
 $s_{x2} = 0$
Else
 $s_{stop} = 0$
 $s_{x2} = 1$
End

--- where d is a value in the signal matrix C={a, b, c, d}; $t_1$ is time for the probe motor 2 to rotate; β is a conversion coefficient, and indicates a movement distance of the probe slider when the probe motor 2 rotates by one circle; λ is a ratio between the length of the remaining weld and the length of the rack, and the value may be obtained as follows: n is a length of the laser range finder, and m is a distance from a center of the magnetic resistance sensor to the origin of coordinates:

$$\lambda = \frac{l_c + n - 2m}{l_c}$$

After scanning, the power supply of the weld scanner is turned off, the fixing bolt 14 is pulled out, the scanning probe portion is removed, the USB data line and power line are put away, and the weld scanner is stored; and the weld scanner may also be put into the start of the next scanning to continue the scanning work. At the moment, the client program may be used to store the data during the scanning process, so as to facilitate subsequent comparative analysis.

The invention claimed is:

1. A weld scanner for a real-life bridge, comprising a running portion and a scanning portion mounted on a scanner chassis, wherein a front end and a tail end of the scanner chassis are both provided with a laser range finder, a magnet is arranged at a bottom portion of the scanner chassis, the scanning portion and the running portion are connected by a chute, the scanning portion comprises a probe slider, a bendable metal pipe and a probe connected in sequence, a gear is arranged on the probe slider, and the gear is meshed with a rack in the chute, and the probe comprises a fixed sleeve, a magnet, a magnetic resistance sensor and a camera, the magnet is mounted in the fixed sleeve, the magnetic resistance sensor is mount at an end of the magnet, and the camera is fixedly mounted on an outer wall of the sleeve.

2. The weld scanner for a real-life bridge according to claim 1, wherein the magnet is an artificial permanent magnet.

3. The weld scanner for a real-life bridge according to claim 1, wherein the scanner chassis is internally provided with a power supply and a control device.

4. The weld scanner for a real-life bridge according to claim 3, wherein the control device is connected to a wireless transceiver.

5. A weld scanner for a real-life bridge, comprising a running portion and a scanning portion mounted on a scanner chassis, wherein a front end and a tail end of the scanner chassis are both provided with a laser range finder, a magnet is arranged at a bottom portion of the scanner chassis, the scanning portion and the running portion are connected by a chute wherein a wheel of the running portion is wrapped with a rubber pad, a wall of the scanner chassis is provided with a wire through hole, the scanner chassis and a probe slider of the scanning portion are provided with a USB interface, and an end portion of the scanner chassis chute is provided with a detachable fixing baffle.

6. A scanning method of a weld scanner for a real-life bridge, the weld scanner including:
a running portion and a scanning portion mounted on a scanner chassis, wherein a front end an a tail end of the scanner chassis are both provided with a laser range finder, a magnet is arranged at a bottom portion of the scanner chassis, the scanning portion and the running portion are connected by a chute.
wherein the scanning method comprises:
the weld scanner scans along a weld direction and gathers signals of all members to a control device;
the control device controls the running portion and the scanning portion, and sends the signals to a client; and
the client analyzes the signals, further obtains a coordinate and a macroscopic image of a suspected defect position according to initially set coordinate positions, and controls an advancing speed of the weld scanner by controlling a frequency converter of the weld scanner, so that the weld scanner can scan the suspected defect position more carefully when a magnetic field change is detected.

* * * * *